Patented Mar. 7, 1950

2,499,377

UNITED STATES PATENT OFFICE 2,499,377

SULFONATED THIO ETHERS AND PROCESS OF MAKING SAME

David Frazier, Bay Village, Ohio, assignor to The Standard Oil Company, Cleveland, Ohio, a corporation of Ohio No Drawing. Application February 6, 1948, Serial No. 6,801

7 Claims. (Cl. 260—513)

This invention relates to new aliphatic sulfides which are particularly useful as surface active agents and detergents, and more particularly to sulfonated aliphatic thio-ethers; and especially to the mixture of sulfonated aliphatic thio-ethers containing radicals corresponding to the mixture of hydrocarbons in "motor polymer" gasoline.

Surface active agents find wide use, and the soap type of wetting agent or detergent is particularly common. There is an extensive demand for surface active agents which do not have the drawbacks of soap; e. g., do not form insoluble precipitates in the presence of hard water. Many so-called "non-soap detergents" have been proposed, and some of these enjoy a measure of commercial success. However, as far as is known, a major drawback of all these non-soap materials is their relatively high cost. The art is confronted with a problem of providing a surface active agent or detergent, which is not sensitive to hard water, at a commercially interesting low cost.

The invention provides a low cost synthetic surface active agent which is not a soap. It is made from materials which are readily available in large quantities and at low cost. The source of supply of such material is more readily regulated than is the source of supply of the tallows or other fats or oils which are used in making soap.

In accordance with the invention, it has been found that a low molecular weight unsaturated hydrocarbon may be reacted with sulfur monochloride, and a chlorinated aliphatic thio-ether results therefrom. This thio-ether may be reacted with sodium sulfite, and a sulfonated aliphatic thio-ether results therefrom. For some purposes, the reaction mixture may be used directly as a surface active agent or detergent. If desired, however, the active wetting agent may be separated from other materials in the reaction product, e. g., a water insoluble organic by-product material (probably a polymeric material) and inorganic salt. If desired, the surface active material, with or without the salt, may be spray dried, vacuum distilled, or otherwise treated in order to bring it into a commercially more desirable form.

The unsaturated aliphatic material may be a hydrocarbon of 4 to 12 carbon atoms, preferably 6 to 10, e. g., a mono-olefin.

The following working examples illustrate the scope of the invention:

(1.) $H_3CCH_2CH_2CH_2CHCH_2-S-CH_2CH_2CH_2CH_2CH_2CH_3$
          $\qquad\qquad\quad\ \,|$
          $\qquad\qquad\quad\ \,SO_3Na$ (2.) $H_3CCH_2CH_2CH_2CHCH_2-S-CH_2CHCH_2CH_2CH_2CH_3$
          $\qquad\qquad\quad\ \,|\qquad\qquad\qquad\ \,|$
          $\qquad\qquad\quad\ \,SO_3Na\qquad\qquad\ SO_3Na$ (3.) $\qquad\qquad\qquad\qquad\quad CH_3$
          $\qquad\qquad\qquad\qquad\quad |$
     $H_3CCH_2CH_2CH_2CHCH-S-CH_2CH_2CH_2CH_2CH_2CH_3$
          $\qquad\qquad\quad\ \,|$
          $\qquad\qquad\quad\ \,SO_3Na$ (4.) $\qquad\quad CH_3\qquad\qquad\ \ C_2H_5\qquad\ CH_3$
          $\qquad\quad |\qquad\qquad\qquad\ |\qquad\qquad\ |$
     $H_3CCCH_2CHCH_2-S-CHCHCH_2CHCH_3$
          $\quad\ |\quad\ \ |$
          $\quad\ CH_3\ SO_3Na\qquad\qquad\ SO_3Na$ (5.) $\qquad\quad CH_3\ CH_3\qquad CH_3$
          $\qquad\quad |\quad\ \ |\qquad\quad |$
     $H_3CCCH_2CCH_2CHCH-S-CH_2CHCH_2CH_3$
          $\quad\ |\quad\ \ |\quad\ \ |\qquad\qquad\qquad |$
          $\quad\ CH_3\ CH_3\ SO_3Na\qquad\quad SO_3Na$ (6.) $\qquad\quad CH_3\ CH_3\quad H_2CCH_3$
          $\qquad\quad |\quad\ \ |\quad\quad |$
     $H_3CCCH_2CHCH_2CHCH-S-CH_2CHCH_2CH_3$
          $\quad\ |\qquad\qquad\ \ |\qquad\qquad\ \ |$
          $\quad\ CH_3\qquad\ \ SO_3Na\qquad\ \ SO_3Na$ (7.) $\qquad CH_3\quad\ CH_3\qquad\quad C_3H_7$
          $\qquad |\qquad\ |\qquad\qquad\ \ |$
     $H_3CCH_2CHCH_2CHCHCH_2-S-CHCHCH_2CH_3$
          $\qquad\qquad\qquad\quad\ |\qquad\qquad\quad |$
          $\qquad\qquad\qquad\quad\ SO_3Na\qquad\ SO_3Na$ (8.)
$\quad CH_3\qquad\qquad\qquad\qquad\qquad\qquad\qquad\qquad\quad CH_3$
$\quad |\qquad\qquad\qquad\qquad\qquad\qquad\qquad\qquad\qquad |$
$H_3CCHCH_2CHCH_2CHCH_2-S-CH_2CHCH_2CHCH_2CHCH_3$
$\qquad\quad\ |\qquad\quad\ |\qquad\qquad\qquad\ \ |\qquad\quad |$
$\qquad\quad\ CH_3\quad SO_3Na\qquad\qquad SO_3Na\ CH_3$ In general, there is used from 0.25 to 0.5 gram mols of sulfur monochloride ($S_2Cl_2$) per gram mol of olefinic pair of carbon atoms in the hydrocarbon; the larger amount being preferred in the case of olefins in which each olefinic carbon atom is attached to one and not more than one non-olefinic carbon atom. This reaction is rapid and is conducted for a sufficient time to produce a chlorinated thio-ether reaction product. A relatively low reaction temperature is desirable, preferably below 100° F., but sufficiently high for the reaction to go, preferably above 80° F. The sulfur chloride should be added gradually, since the reaction is rapid; and especially if the reaction proceeds too vigorously, some of the organic material tends to be converted to an undesirable by-product. In the treatment of the chlorinated thio-ether with sodium sulfite, one gram mol of the sulfite is used per gram atom of chlorine in the chlorinated thio-ether, or if desired, an excess of the sulfite may be used.

From the commercial viewpoint, the relatively low cost olefin mixture known as "motor polymer" gasoline is particularly desirable. Motor polymer is usually made from $C_3$ and $C_4$ olefins by non-selective polymerization, e. g., with a phosphorus acid type catalyst. Motor polymer boils in the range of 80° to 500° F., with a major portion boiling in the range of 120° to 400° F. It is comprised of olefins of 7 to 12 carbon atoms, mostly 8 to 10. A particularly desirable portion is the "motor polymer" gasoline or overhead fraction removed from motor polymer by fractional distillation up to the 250° cut point, which comprises mostly olefins of 7 to 9 carbon atoms.

In a typical illustrative preparation, 2620 grams of sulfur monochloride is added to 5241 grams of the above overhead motor polymer fraction. Heat is evolved and some hydrochloric acid is also evolved. The evolution of hydrochloric acid is kept at a minimum by adding the sulfur chloride gradually, over a period of 45 minutes. The reaction temperature is kept below 100°, e. g., 80° to 100° F. The reaction product is blown with air, or heated in a vacuum, to remove volatile materials.

This reaction product is then added to 4200 grams of sodium sulfite (calculated as anhydrous) in 8 liters of water, and the mixture is heated with refluxing for 3 hours, with agitation. It is then allowed to stand. Two layers form. The top layer of organic material is separated. The separated top or organic layer may be steam distilled to remove any unreacted motor polymer gasoline.

The bottom or aqueous layer is extracted, first with naphtha or any other water-immiscible solvent, such as hexane, ether, etc., to separate water insoluble organic compounds. The sulfonate and salt are left behind in the water layer. If the salt is to be removed, the mixture is extracted with ethyl acetate. Only a relatively small amount of ethyl acetate is used; i. e., about 1 part by volume for each 25 parts of the aqueous phase. If desired, the ethyl acetate may be replaced by chloroform or any other solvent for the sulfonated thio-ether. The ethyl acetate extract contains the sulfonated thio-ether. Most of the salt and water remains as a lower layer. After removing the ethyl acetate solvent, about 45% yield of the sulfonated thio-ether is obtained as an extract residue.

If desired, after the water salt layer has been removed, a large amount of alcohol, acetone, or the like may be added to the ethyl acetate-sulfonate layer (e. g., 1 volume of the alcohol per volume of the ethyl acetate). This causes precipitation of practically all of the inorganic salts, such as sodium chloride, sodium sulfite, and the like as a solid.

Following this procedure, any of the above mentioned sulfonated thio-ethers is prepared, or any of the thio-ethers corresponding to the above-mentioned unsaturated hydrocarbons is prepared. If desired, a chlorinated thio-ether may be distilled, solvent extracted, or otherwise fractionated to separate the specific chlorinated thio-ethers. However, for commercial purposes, the mixture is preferred. The total reaction mixture may be purified to any extent desired. For instance, if there is no objection to the presence of the salt, the first extraction with naphtha is sufficient.

The refined reaction product of the above-illustrative example analyzes 38.8% carbon, 6.0% hydrogen, 22.2% sulfur and 32.7% ash (as sulfate). Its molecular weight, as determined by the cryoscopic method, is 432, and the weight of 1 equivalent thereof (as acid) is 216. This corresponds to a formula of the type $$R_2S(SO_3Na)_{1.5}$$

where R is a hydrocarbon radical of 6 to 12 carbon atoms, with the major amount being 7 to 9, and R is for the most part saturated and is probably a mixture of $$(NaO_3S)R—S—R'(SO_2Na)$$

and $$(NaO_3S)R—S—R'$$

where R' is also a hydrocarbon radical of 6 to 12 carbon atoms, mostly 7 to 9, and probably saturated. This reaction product (ethyl acetate extract) shows the following surface active properties, as compared to an ordinary commercial floating white soap.

| Concentration | 0.1% (Wt.) | 0.5% | 1.0% | 4.0% |
|---|---|---|---|---|

A. SURFACE TENSION IN WATER (dynes/cm.)

| | | | | |
|---|---|---|---|---|
| Floating Soap | 28.0 | 30.5 | 28.2 | 36.5 |
| Sulfonate of the above example | 38.9 | 34.0 | 33.5 | 32.6 |

B. INTERFACIAL TENSION AGAINST WHITE OIL (Petroleum Oil) (dynes/cm.)

| | | | | |
|---|---|---|---|---|
| Floating Soap | 6.6 | 5.2 | Too viscous | 5.3 |
| Sulfonate of the above example | 12.1 | 6.7 | 6.1 | |

C. CANVAS PATCH WETTING TIME

| | | | | |
|---|---|---|---|---|
| Floating Soap | 142 minutes | (Too viscous) | | |
| Sulfonate of the above example | | 29 | 6 | 1.2 |

D. EMULSIFYING PROPERTIES

[Equal volumes water and white oil shaken; time measured after first 10 seconds to beginning of creaming]

| | | | | |
|---|---|---|---|---|
| Floating Soap | 12 seconds | 13 | 3,050 | 5,000 |
| Sulfonate of the above example | 3 seconds | 20 | 60 | 25 |
| Sulfonate of the above example (further purified) [1] | 6 seconds | 10 | 12 | 16 |

[1] By precipitating salts with alcohol.

E. FOAMING PROPERTIES OF 1% SOLUTIONS

|  | Foam Height in Cm. | | | |
| --- | --- | --- | --- | --- |
|  | 0 | 10 sec. | 1 min. | 10 min. |
| Floating Soap | 2.7 | 1.5 | 1.5 | 1.3 |
| Sulfonate of the above example | 3.2 | 3.0 | 2.5 | 1.2 |

F. DETERGENT PROPERTIES

[Standard soiled cotton cloth washed in 0.2% solutions under standard conditions; washed, dried and compared with an arbitrary 1 to 10 gray scale]

|  | Distilled Water | Tap Water |
| --- | --- | --- |
| Floating Soap | 2 | 5 |
| Sulfonate of the above example at an acidic pH | 5½ | 4 |
| Sulfonate of the above example at a basic pH | 3½ | 5½ |

In addition, the sulfonate of the above examples compares favorably, as to the above test characteristics, with a petroleum sulfonate available commercially as "Penola 2210" and a petroleum sulfonate available commercially as "Oronite #3", a high molecular weight complex alcohol available commercially as "Triton NE", a dibutylphenylphenol sodium disulfonate available commercially as "Aresklene 400", and a monobutylphenylphenol sodium monosulfonate available commercially as "Areskap".

The sulfonate may be mixed with bulking agents, such as sodium sulfate, starch, polyvinyl alcohols, and with builders, such as phosphates, carbonates, silicates, etc., and is well known in the art.

In view of the foregoing disclosure, variations and modifications will be apparent to those skilled in the art, and it is intended to claim the invention broadly, including such variations and modifications, except as do not come within the scope of the appended claims.

I claim:

1. A sulfonated dialkyl thio-ether, in which each alkyl group contains from 6 to 12 carbon atoms.

2. A mixture of monosulfonated and disulfonated dialkyl thio-ethers, in which each alkyl group contains from 6 to 12 carbon atoms.

3. A surface active composition of matter, the surface active agent of which comprises a sulfonated dialkyl thio-ether, in which each alkyl group contains from 6 to 12 carbon atoms.

4. A detergent comprising as the active detergent agent a mixture of monosulfonated and disulfonated dialkyl thio-ether, in which each alkyl group contains from 7 to 9 carbon atoms.

5. A method of preparing a sulfonated aliphatic thio-ether, which comprises reacting an olefin with from 0.25 to 0.5 mols of sulfur monochloride per gram molecular weights of olefinic groups in the olefin, whereby chlorinated aliphatic thio-ether is formed, then reacting said chlorinated aliphatic thio-ether with sodium sulfite, to replace chlorine groups therein by sulfonic groups.

6. A method of preparing a sulfonated aliphatic thio-ether, which comprises reacting an olefin, having from 6 to 12 carbon atoms in the molecule, with from 0.25 to 0.5 mols of sulfur monochloride per gram molecular weights of olefinic groups in the olefin, whereby chlorinated aliphatic thio-ether is formed, then reacting said chlorinated aliphatic thio-ether with sodium sulfite, to replace chlorine groups therein by sulfonic groups.

7. A method of preparing a sulfonated aliphatic thio-ether, which comprises reacting a 250° F. overhead fraction of motor polymer with from 0.25 to 0.5 mols of sulfur monochloride per gram molecular weights of olefinic groups in the olefin, whereby chlorinated aliphatic thio-ether is formed, then reacting said chlorinated aliphatic thio-ether with sodium sulfite, to replace chlorine groups therein by sulfonic groups, and then extracting the sulfonate from unreacted olefins and sulfides.

DAVID FRAZIER.

REFERENCES CITED

The following references are of record in the file of this patent:

UNITED STATES PATENTS

| Number | Name | Date |
| --- | --- | --- |
| 2,140,569 | Ufer et al. | Dec. 20, 1938 |
| 2,249,312 | Kimball | July 15, 1941 |
| 2,316,538 | Orthner | Apr. 13, 1943 |
| 2,346,102 | de Simo et al. | Apr. 4, 1944 |

Certificate of Correction

Patent No. 2,499,377 — March 7, 1950

DAVID FRAZIER

It is hereby certified that error appears in the printed specification of the above numbered patent requiring correction as follows:

Column 4, line 37, for that portion of the formula reading "$(SO_2Na)$" read $(SO_3Na)$;

and that the said Letters Patent should be read with this correction therein that the same may conform to the record of the case in the Patent Office.

Signed and sealed this 20th day of June, A. D. 1950.

[SEAL]

THOMAS F. MURPHY,
*Assistant Commissioner of Patents.*